(12) United States Patent
Guo

(10) Patent No.: US 11,204,439 B2
(45) Date of Patent: Dec. 21, 2021

(54) POROSITY DETERMINATION USING OPTIMIZATION OF INELASTIC AND CAPTURE COUNT RATES IN DOWNHOLE LOGGING

(71) Applicant: Halliburton Energy Services, Inc., Houston, TX (US)

(72) Inventor: Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 2 days.

(21) Appl. No.: 16/861,896

(22) Filed: Apr. 29, 2020

(65) Prior Publication Data

US 2021/0341640 A1 Nov. 4, 2021

(51) Int. Cl.
*G01V 5/12* (2006.01)
*E21B 47/135* (2012.01)
*G01V 5/04* (2006.01)

(52) U.S. Cl.
CPC .............. *G01V 5/12* (2013.01); *E21B 47/135* (2020.05); *G01V 5/045* (2013.01)

(58) Field of Classification Search
CPC ......... G01V 5/12; G01V 5/045; G01V 47/135
See application file for complete search history.

(56) References Cited

U.S. PATENT DOCUMENTS

| | | | | |
|---|---|---|---|---|
| 3,508,052 A | | 4/1970 | Seevers | |
| 3,780,301 A | * | 12/1973 | Smith, Jr. | G01V 5/102 250/301 |
| 3,849,646 A | * | 11/1974 | McKinlay | G01V 5/102 376/163 |
| 3,947,683 A | * | 3/1976 | Schultz | G01V 5/102 250/269.6 |
| 4,020,342 A | * | 4/1977 | Smith, Jr. | G01V 5/102 250/269.8 |
| 4,686,364 A | * | 8/1987 | Herron | E21B 49/00 250/256 |
| 5,053,620 A | * | 10/1991 | McKeon | G01V 5/06 250/269.7 |
| 10,145,978 B2 | | 12/2018 | Guo et al. | |

(Continued)

OTHER PUBLICATIONS

Jacobson et al., "Cased-Hole Porosity Measurements Using Pulsed-Neutron Logging Tools," *SPWLA 54th* Annual Logging Symposium, Jun. 22-26, 2013, New Orleans, Louisiana, USA.

(Continued)

*Primary Examiner* — Blake C Riddick
(74) *Attorney, Agent, or Firm* — Haynes and Boone, LLP

(57) ABSTRACT

The inelastic and capture ratio is optimized for porosity measurements in downhole applications. Pulsed-neutron data is acquired using a pulsed-neutron downhole tool. At each sampling point or log depth, the inelastic count rates and capture rates are computed. The inelastic count rate is corrected for the capture count background to increase porosity sensitivity. The capture count rate is computed by summing a range of time windows in the decay curve. In this process, the inelastic and capture responses are matched for borehole sensitivity. The ratio of inelastic and capture counts is computed. This ratio is the input to the characterized transform algorithm to compute measured porosity.

17 Claims, 6 Drawing Sheets

(56) References Cited

U.S. PATENT DOCUMENTS

| | | | | |
|---|---|---|---|---|
| 2003/0178560 A1* | 9/2003 | Odom | ............... | G01V 5/104 250/269.2 |
| 2005/0067160 A1* | 3/2005 | Jacobson | ............... | G01V 5/101 166/250.01 |
| 2008/0179509 A1* | 7/2008 | Jacobi | ............... | G01V 5/104 250/269.2 |
| 2008/0179510 A1* | 7/2008 | Jacobi | ............... | G01V 5/104 250/269.6 |
| 2009/0026359 A1* | 1/2009 | Stephenson | ............... | G01V 5/125 250/269.7 |
| 2010/0193676 A1* | 8/2010 | Jacobson | ............... | G01V 5/102 250/269.6 |
| 2012/0016588 A1* | 1/2012 | Evans | ............... | G01V 5/104 702/8 |
| 2012/0068060 A1* | 3/2012 | Chace | ............... | G01V 5/125 250/269.7 |
| 2012/0197529 A1* | 8/2012 | Stephenson | ............... | G01V 5/104 702/8 |
| 2013/0211724 A1 | 8/2013 | Fitzgerald et al. | | |
| 2014/0330520 A1* | 11/2014 | Kwong | ............... | G01V 5/101 702/8 |
| 2015/0041633 A1* | 2/2015 | Guo | ............... | G01V 5/102 250/262 |
| 2015/0241595 A1* | 8/2015 | Kwong | ............... | E21B 49/087 250/269.1 |
| 2017/0153354 A1* | 6/2017 | Grau | ............... | G01V 5/101 |
| 2017/0227671 A1 | 8/2017 | Zhou | | |
| 2018/0210110 A1 | 7/2018 | Stephenson et al. | | |
| 2020/0326451 A1* | 10/2020 | Schmid | ............... | G01V 5/101 |

OTHER PUBLICATIONS

International Search Report and Written Opinion issued for International Patent Application No. PCT/US2020/030463, dated Jan. 20, 2021, 10 pages.

* cited by examiner

POROSITY DETERMINATION USING OPTIMIZATION OF INELASTIC AND CAPTURE COUNT RATES IN DOWNHOLE LOGGING

FIELD OF THE DISCLOSURE

The present disclosure relates generally to downhole logging using gamma ray detection and, more specifically, to a downhole logging method and system for correcting inelastic count rates used to determine porosity.

BACKGROUND

Porosity is one of the most important petrophysics parameters for characterizing reservoirs. Neutron-gamma porosity measurements are a much deeper reading than other porosity logging technologies. However, the relatively low measurement sensitivity and high borehole fluid salinity dependence of neutron-gamma porosity measurements have been technical challenges for all service providers.

In existing downhole technologies, neutrons interact with the surrounding medium to produce gamma rays. These gamma counts are tallied by detector(s) in both the time and energy domains. The measurement of gamma rays provides useful information on physical properties, such as hydrogen index. For example, a pulsed-neutron generator ("PNG") produces high-energy neutrons. A Tritium-tritium device generates 14 MeV neutrons. Such a device typically operates in pulsing mode. The pulsing frequency may vary from 1 kHz to tens of kHz.

Hydrogen index and porosity are two closely related terms and often used in the technical literatures equivalently. The primary petrophysical difference between the terms involves cases when the rock matrix contains hydrogen, such as in the case of illite or smectite. In either situation, there are various methods to convert hydrogen index to porosity and vice versa.

When 14 MeV neutrons emit from a neutron generator, they go through scattering events until they are captured. When these high-energy neutrons scatter with nucleuses of heavier earth elements, such as Oxygen, Silicon and Calcium, inelastic reaction may occur. The inelastic reaction is the primary reaction when the PNG is Pulsed ON. Some of these inelastic gamma rays are recorded in detectors along with their associated times and energies.

When high-energy neutrons scatter with lighter earth elements, such as Hydrogen, the energy loss is large. Eventually, the neutron energy goes down to below electron volts. These low energy neutrons have a high likelihood of being captured by formation nucleuses.

The effects of hydrogen index on porosity determinations are complex. The higher hydrogen index is, the smaller source clouds are, therefore the longer the attenuation distances are. However, the higher hydrogen index, the smaller the formation density. Both of these phenomena compete against each other as the hydrogen index varies from 0 (hard rock) to 1 (water). In addition, porosity traditionally has been computed using ratios of capture counts of two or more gamma detectors at different spacing. This ratio is more sensitive to hydrogen index than inelastic ratios for the reason of larger source clouds. However, at medium to high porosities, the opposite gamma attenuation effect comes into competition, thus resulting in the ratio to hydrogen index sensitivity being significantly reduced or even reversed and thereby resulting in erroneous porosity readings.

DESCRIPTION OF ILLUSTRATIVE EMBODIMENTS

Figure 1A:
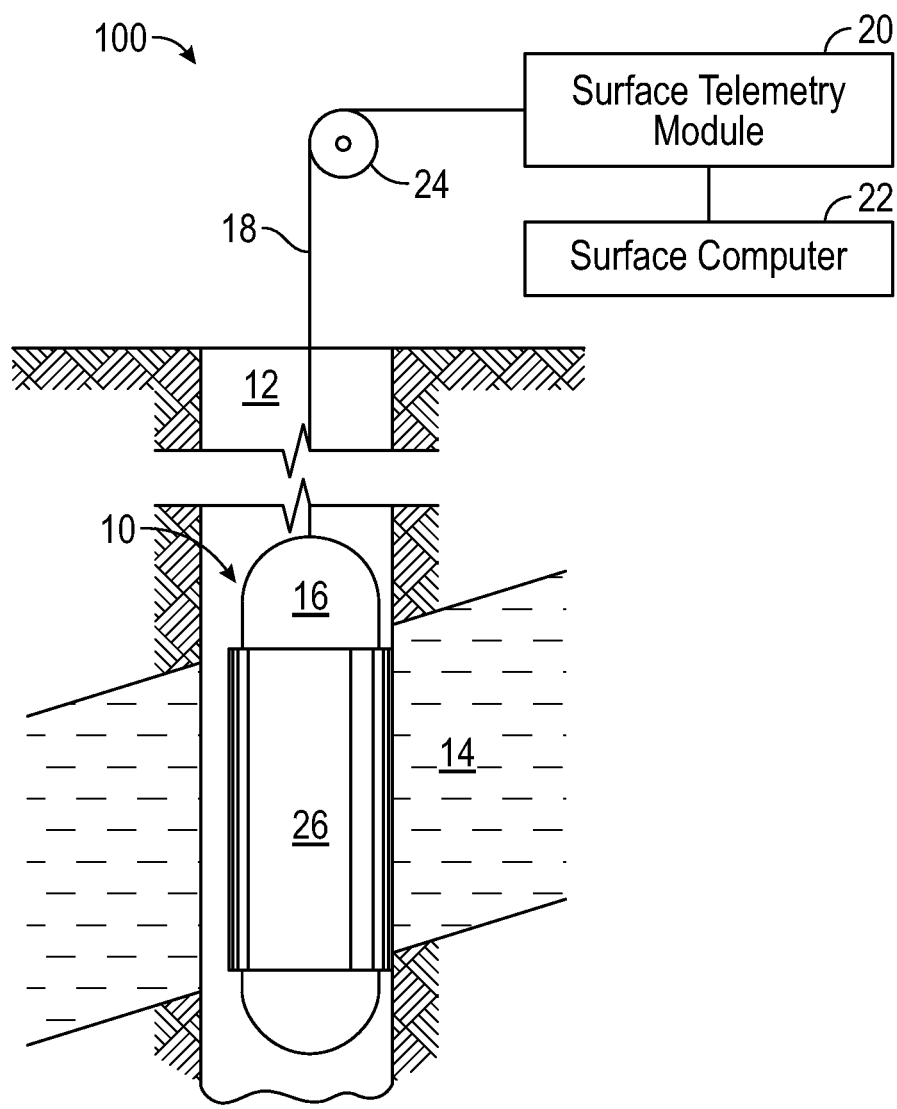
FIG. 1A illustrates a nuclear logging system deployed along a wireline constructed in accordance with a least some illustrative embodiments of the present disclosure.

Illustrative embodiments and related methods of the present disclosure are described below as they might be employed in a downhole system and method to correct inelastic count rates to remove the capture count background to increase porosity sensitivity. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

Certain terms are used throughout the following description and claims to refer to particular system components. As one ordinarily skilled in the art will appreciate, oilfield service companies may refer to a component by different names. This document does not intend to distinguish between components that differ in name but not function.

In the following discussion and in the claims, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy in the form of electromagnetic radiation created and/or released due to neutron interaction with atoms, and in particular atomic nuclei, and shall include such energy whether such energy is considered a particle (i.e., gamma particle) or a wave (i.e., gamma ray or wave).

"Inelastic count rate" shall mean a gamma count rate during periods of time when gammas created by inelastic collisions are the predominant gammas created and/or counted (e.g., during the neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as capture count rate.

"Gamma count rate decay curve" shall mean, for a particular gamma detector, a plurality of count values, each count value based on gammas counted during a particular time bin. The count values may be adjusted up or down to account for differences in the number of neutrons giving rise to the gammas or different tools, and such adjustment shall not negate the status as a "gamma count rate decay curve."

As will be described below, illustrative methods and embodiments of the present are used to determine porosity of a subterranean formation. A downhole tool having one or more gamma detectors is deployed into a borehole. Inelastic gammas and capture gammas are detected using the detectors for a specified borehole depth of the formation. The inelastic count rate is calculated by summing inelastic and capture counts during an ON cycle of the downhole tool. The estimated capture background count rate that occurs during an OFF cycle of the downhole tool is also calculated. The estimated capture background count rate is then subtracted from the summed inelastic counts, thereby computing the inelastic count rate. A true capture count rate is calculated by summing capture counts during the OFF cycle of the downhole tool. The ratio of the inelastic count rate to the true capture count rate is calculated. The ratio is then used to determine the porosity of the formation. By optimizing the inelastic and capture count rates, the present disclosure provides a significant step forward to replace chemical neutron source methods in the industry.

Various embodiments are described herein in the context of wireline logging tools; however, the various systems and methods find application not only in wireline logging tools, but also measuring-while-drilling ("MWD") and logging-while-drilling tools ("LWD"). Further still, the various embodiments also find application in other conveyances including coiled tubing, dip tubing, production tubing, tractor or "slickline" tools. In slickline applications, the logging tool is placed downhole (e.g., as part of a drill string, or as a standalone device) and the logging tool gathers data that is stored in a memory within the device (i.e., not telemetered to the surface). In those embodiments which are not telemetered, once the tool is brought back to the surface, the data is downloaded, some or all the processing takes place, and the logging data is printed or otherwise displayed. Thus, the developmental context shall not be construed as a limitation as to the applicability of the various embodiments.

Formation porosity is one of the most important petrophysical parameters for reservoir characterization. A pulsed-neutron tool is sensitive to formation hydrogen index/porosity, from which, with additional information and/or assumptions regarding the formation, a porosity value can be inferred.

FIG. 1A illustrates a nuclear logging system 100 constructed in accordance with a least some embodiments. In particular, system 100 comprises a logging tool 10 (e.g., a PNG tool) placed within a borehole 12 proximate to a formation 14 of interest. The tool 10 comprises a pressure vessel 16 within which various subsystems of tool 10 reside, and in the illustrative case of FIG. 1A pressure vessel 16 is suspended within borehole 12 by a conveyance 18. Conveyance 18, in some embodiments is a multi-conductor armored cable, not only provides support for pressure vessel 16, but also in these embodiments communicatively couples logging tool 10 to a surface telemetry module 20 and a surface computer 22. In other embodiments, conveyance 18 may include any suitable means for providing mechanical conveyance for tool 10, including, but not limited to, wireline, slickline, coiled tubing, pipe, drill pipe, downhole tractor, or the like. Surface computer 22 is a control system interconnected to the logging tool 10 through conveyance 18 to perform transmission of electrical power and data/command signals, and also provides control over operation of the components in tool 10. However, in other embodiments logging tool 10 may be powered by a downhole battery or other downhole power source. The logging tool 10 may be raised and lowered within borehole 12 by way of conveyance 18, and the depth of logging tool 10 within borehole 12 may be determined by depth measurement system 24 (illustrated as a depth wheel). In some embodiments, pressure vessel 16 may be covered with a thermal neutron absorptive material 26 (the thickness of which is exaggerated for clarity of the figure); however, in other embodiments material 26 may be only partially present or omitted altogether.

The processing circuitry of surface computer 22 may take a variety of forms and, in alternative embodiments, may be located downhole. For example, the processing circuitry may include at least one processor, a non-transitory, computer-readable memory, transceiver/network communication module, and optional I/O devices and user interface, all interconnected via a system bus. Software instructions executable by the processor for implementing the functions of the illustrative methods described herein may be stored in memory.

In certain embodiments, the processing circuitry may be connected to one or more public and/or private networks via one or more appropriate network connections. It will also be recognized that the software instructions to perform the functions of the present disclosure may also be loaded into memory from a CD-ROM or other appropriate storage media via wired or wireless methods.

Figure 1B:
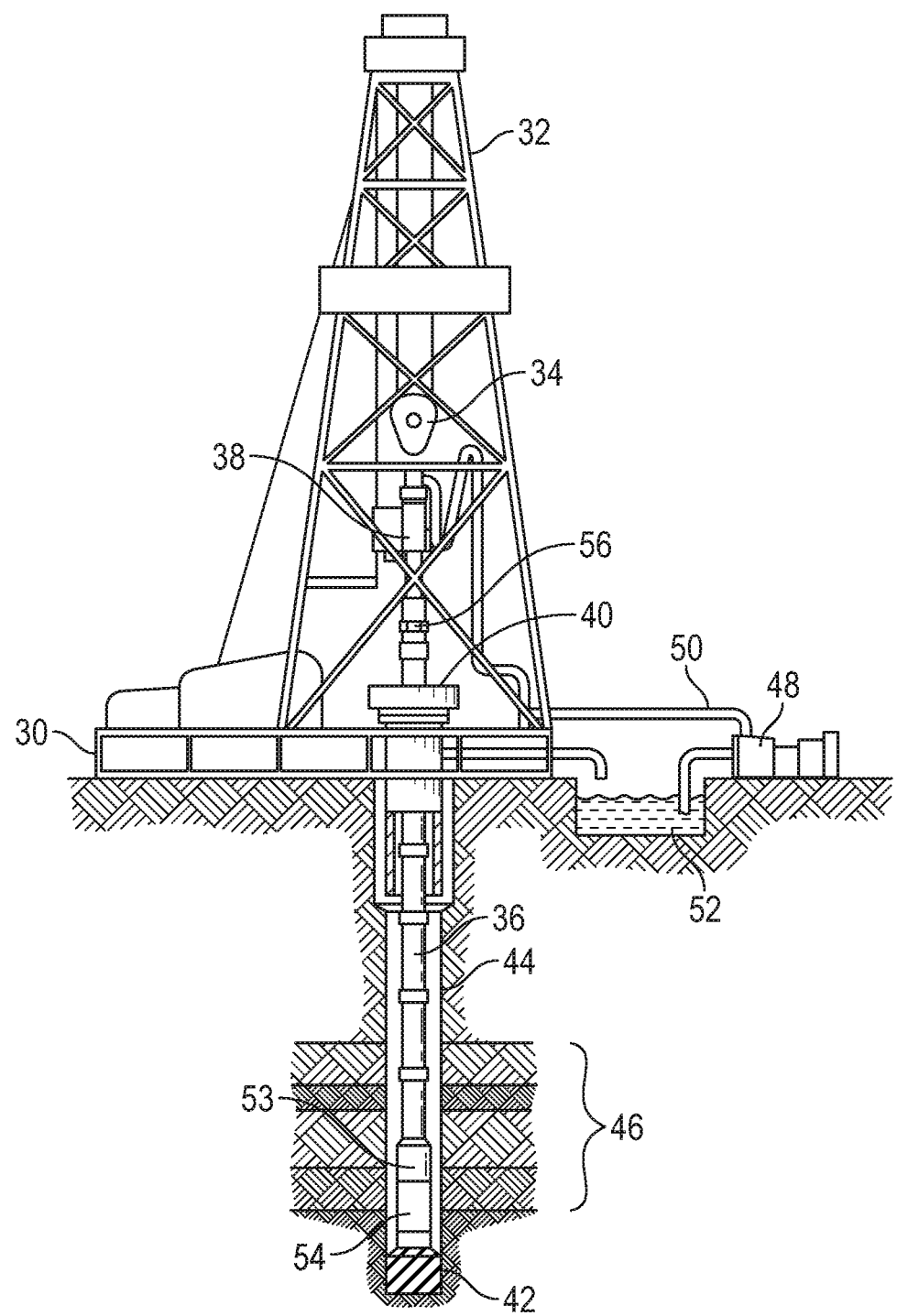
FIG. 1B illustrates another nuclear logging system deployed in a logging-while-drilling application, according to certain illustrative embodiments of the present disclosure.

FIG. 1B illustrates another wellbore environment and LWD system in which illustrative methods of the present disclosure may be performed. Drilling platform 30 is equipped with a derrick 32 that supports a hoist 34 for raising and lowering a drill string 36. Hoist 34 suspends a top drive 38 suitable for rotating drill string 36 and lowering it through well head 40. Connected to the lower end of drill string 36 is a drill bit 42. As drill bit 42 rotates, it creates a wellbore/borehole 44 that passes through various layers of a formation 46. A pump 48 circulates drilling fluid through a supply pipe 50 to top drive 38, down through the interior of drill string 36, through orifices in drill bit 42, back to the surface via the annulus around drill string 36, and into a retention pit 52. The drilling fluid transports cuttings from the borehole into pit 52 and aids in maintaining the integrity of wellbore 44. Various materials can be used for drilling fluid, including, but not limited to, a salt-water based conductive mud.

A logging tool 53, such as a PNG tool executing the methods as described herein, is integrated into the bottomhole assembly near bit 42. In this illustrative embodiment, logging tool 53 is configured to obtain measurements and collect information regarding count rates, as described herein. A telemetry sub 54 may be included to transfer measurement data/signals to a surface receiver 56 and to receive commands from the surface. In some embodiments, the telemetry sub does not communicate with the surface, but rather stores measurement data for later retrieval at the surface when the logging assembly is recovered.

In certain embodiments, logging tool 53 includes a system control center ("SCC"), along with necessary processing/storage/communication circuitry to acquire and process the count rate data described herein. In certain embodiments, once the measurements are acquired, the system control center performs the methods described herein, and then communicates the data back to local storage, uphole and/or to other assembly components via the telemetry sub. In an alternate embodiment, the system control center may be located at a remote location away from logging tool 53, such as the surface or in a different borehole, and performs the processing accordingly. These and other variations within the present disclosure will be readily apparent to those ordinarily skilled in the art having the benefit of this disclosure. Moreover, logging tool 53 may be powered remotely or using a downhole power source.

Figure 2:
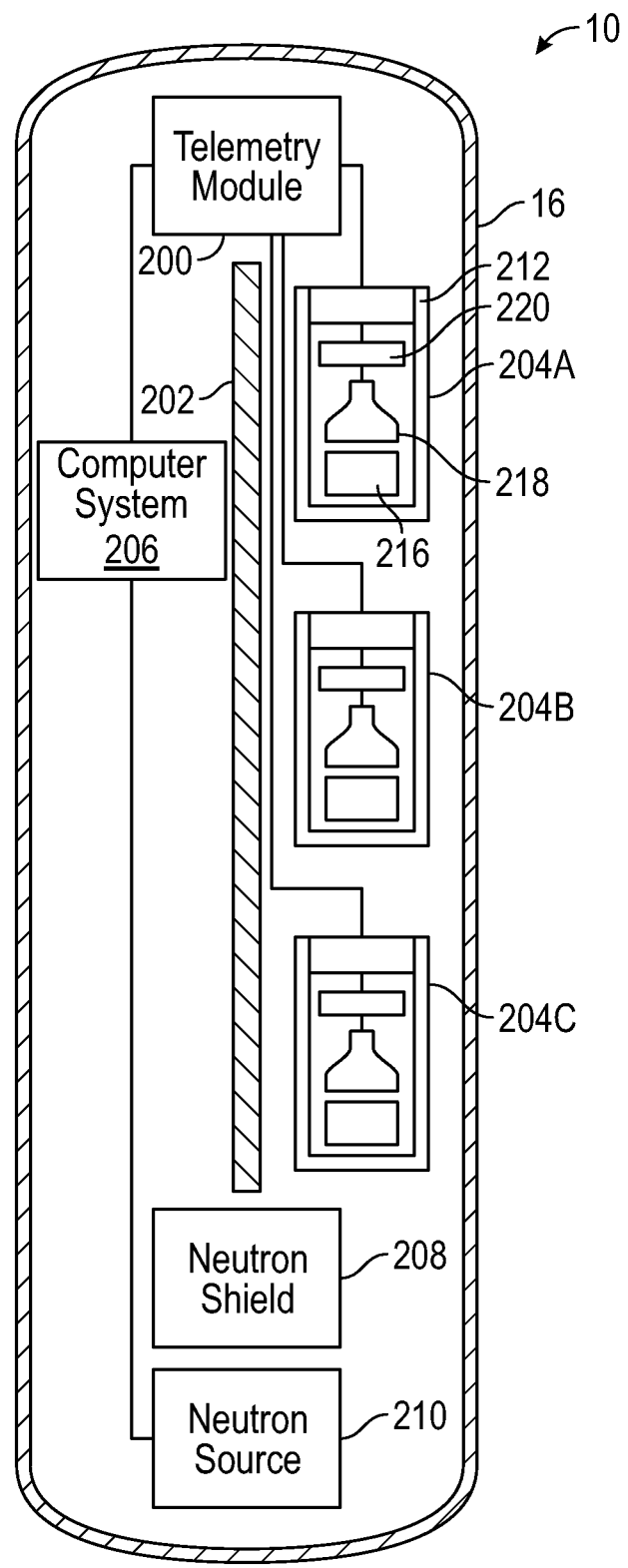
FIG. 2 shows a simplified cross-sectional view of the logging tool to illustrate the internal components in accordance with certain embodiments of the present disclosure.

FIG. 2 shows a simplified cross-sectional view of the PNG logging tool 10 (or logging tool 53) to illustrate the internal components in accordance with certain embodiments of the present disclosure. In particular, FIG. 2 illustrates the pressure vessel 16 houses various components, such as a telemetry module 200, borehole shield 202, a plurality of gamma detectors 204 (in this illustrative case three gamma detectors labeled 204A, 204B and 204C), computer system 206, a neutron shield 208 and a neutron source 210. In other embodiments, only a single gamma detector may be used. While gamma detectors 204 are shown above neutron source 210, in other embodiments the gamma detectors may be below the neutron source. In at least some embodiments, gamma detector 204C may be disposed in the range from about 6 inches to 18 inches (0.15-0.45 meters) from neutron source 210. And, in at least some embodiments, gamma detector 204B may be in the range of 18 inches to 30 inches (0.45-0.76 meters) from the neutron source 210. The gamma detector 204A may be on the order of 32.5 to 36 inches (from the neutron source 210). Other spacing may be equivalently used, however. Neutron shield 202 may make gamma detectors 204 receive more favorably formation-sourced gammas (as opposed to borehole-sourced gammas), and the neutron shield 208 may be a high density material (e.g., tungsten alloy or other material with a density more than 10 g/cc).

In some embodiments, neutron source 210 is a Deuterium/Tritium neutron generator. The neutron source 210, under command from a surface or downhole computer, generates and/or releases energetic neutrons. In order to reduce the irradiation of gamma detectors 204 and other devices by energetic neutrons from neutron source 210, neutron shield 208 separates neutron source 210 from gamma detectors 204. Because of the speed of the energetic neutrons (e.g., 30,000 kilometers/second or more), and because of collisions of the neutrons with atomic nuclei that change the direction of movement of the neutrons, a neutron flux is created around logging tool 10 that extends into the formation 14.

Neutrons generated and/or released by source 210 interact with atoms by way of inelastic collisions, elastic scattering and/or thermal capture. In the case of inelastic collisions, a neutron collides with an atomic nucleus and a gamma is emitted (an inelastic gamma) when the struck nucleus, having been raised to an excited state, decays. The energy of the neutron is also reduced accordingly. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma. Further when high-energy neutrons scatter with lighter earth elements, such as Hydrogen, an elastic collision ensues and the energy loss by the neutron may be quite large; the energy lost by the neutron being carried off by the recoiling nucleus. A neutron may continue to slow down and lose energy via one or more elastic collisions with light nuclei (which do not generate gammas) until it reaches thermal energy level.

After one or more inelastic and/or elastic collisions (and corresponding loss of energy) a neutron reaches an energy known as thermal energy (i.e., a thermal neutron). At thermal energy, a neutron can be captured by atomic nuclei. In a capture event, the capturing atomic nucleus enters an excited state and the nucleus later transitions to a lower energy state by release of a gamma (known as a thermal gamma or capture gamma). At least some of the capture gammas created by thermal capture are also incident upon the gamma detectors 204. One or both of the arrival time of a particular gamma and its energy may be used to determine status as a capture gamma.

Still referring to FIG. 2, when operational the gamma detectors 204 detect arrival and energy of gammas. Referring to gamma detector 204A as indicative of all the gamma detectors 204, a gamma detector comprises an enclosure 212, and within the enclosure 212 resides; a crystal 216 (e.g., a one inch by six inch yttrium/gadolinium silicate scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface or downhole computer. In alternative embodiments, the output data may also be stored in memory.

Figure 3:
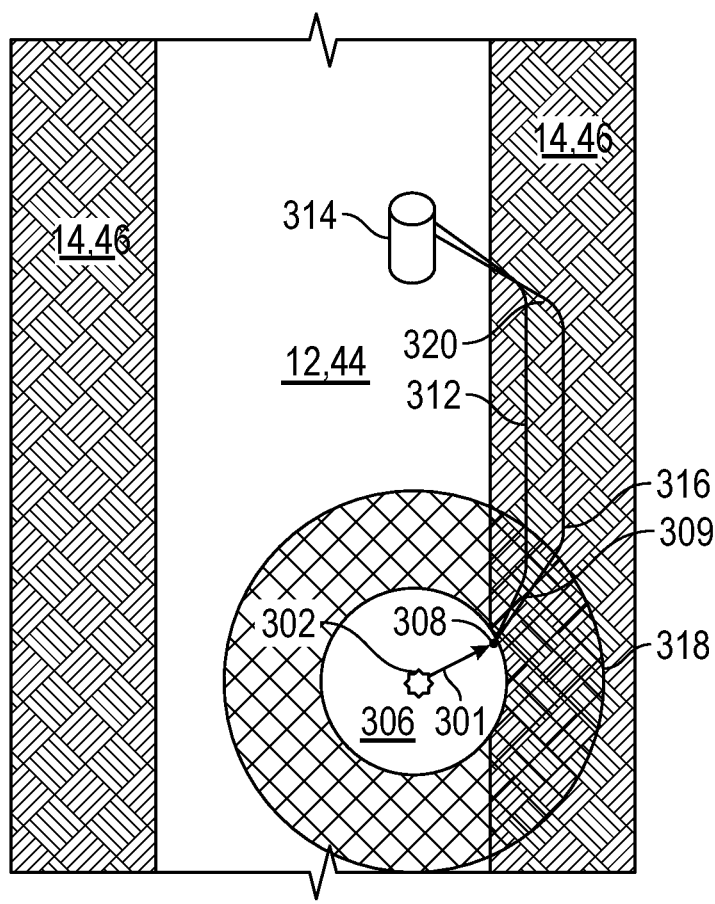
FIG. 3 shows a cross-sectional elevation view of a formation penetrated by a borehole, according to certain embodiments of the present disclosure.

In order to discuss the concepts of source volumes for different types of gammas, reference is made to FIG. 3. In particular, FIG. 3 shows a cross-sectional elevation view of a formation 14,46 penetrated by a borehole 12,44. Within the borehole 12,44 are a neutron source 302 and a gamma detector 314, the gamma detector 314 illustratively at a distance above the neutron source 302. Generation and/or release of neutrons can be considered to create a spherical inelastic gamma source volume 306 (shown in the cross-sectional view of FIG. 3 as a circular region), and within the first source volume 306 inelastic gammas are created. Moreover, the generation and/or release of neutrons can be considered to create a spherical capture gamma source volume 318 (again shown in the cross-sectional view of FIG. 3 as a circular region), and within the second source volume 306 capture gammas are created.

In example systems, 14 MeV neutrons are emitted from the neutron source, and the neutrons go through scattering events till capture. The scattering events may give rise to the generation of gammas, which then propagate through the formation, and some of gammas are incident upon the detectors. Consider an example neutron generated and/or released from the source 302. When generated and/or released from the source 302, an example travel path for the neutron is represented by arrow 301. When a neutron scatters with a nucleus of heavier earth elements, such as Oxygen, Silicon and Calcium, inelastic collisions with the nuclei may occur within an inelastic gamma source volume 306. The inelastic reaction is the primary reaction when the PNG is pulsed ON. Source volume 306 can be considered spherical for ease of conception; however, the shape of the region in which gamma production by inelastic neutron scattering occurs need not necessarily be spherical and may vary in shape depending, for example, on the structure and composition of the formation and the geometry of the pulsed neutron source. A spherical region might be expected for a substantially isotropic neutron source and medium. A neutron making an inelastic collision at 308, for example, loses energy to the struck nucleus. Although the neutron is depicted as undergoing an inelastic collision at the edge of source volume 306, inelastic collisions occur throughout the source volume. As previously described, the struck nucleus emits the energy received from the neutron in the form of an inelastic gamma.

With respect to the inelastic gammas, some of these inelastic gammas reach a detector and are tallied therein, with particular time and energy. That is, the flux of inelastic gammas is attenuated as the gammas propagate through the formation such that only a portion of the gammas reach the detector. A gamma transmission efficiency model may be created that characterizes the attenuation, and in example cases the attenuation may be characterized by an exponential attenuation, such as shown by equation (1):

$$N_{Inel} = A_{Inel} e^{-\rho \mu L_{Inel}} \quad (1)$$

where $N_{Inel}$ is the inelastic count rate, $A_{Inel}$ is a value indicative of the inelastic gammas in the source volume initially moving toward the detector, $\rho$ is formation density, $\mu$ is formation mass attenuation coefficient, and $L_{Inel}$ is the attenuation distance between the inelastic source region and the detector. The attenuation distance may schematically be represented by the length of track 312 from source region 306 to detector 314.

Still referring to FIG. 3, a neutron having inelastically scattered off of constituent nuclei of the formation and additionally lost energy via elastic collisions may undergo thermal capture within the capture source volume 318, for example, at 316. Source volume 318 can be considered spherical for ease of conception; however, the shape of the region in which gamma production by neutron capture occurs need not necessarily be spherical and may vary in shape depending, for example, on the structure and composition of the formation and the geometry of the pulsed neutron source. Moreover, source volume 318 in the example situation subsumes inelastic source volume 306. Although the neutron is depicted as undergoing a capture collision at 316 at the edge of source volume 318, capture events can occur throughout the source volume 318. The capture reaction is the primary reaction when the PNG is pulsed OFF. The capture gamma emitted when the excited target nucleus decays also propagates through formation 14,46, as schematically illustrated by track 320.

As with the inelastic gammas, a gamma transmission efficiency model for the capture gammas may be created that characterizes the attenuation as the gammas travel toward the detector, and in example cases the attenuation may be characterized by an exponential attenuation, such as shown by equation (2):

$$N_{Cap} = A_{Cap} e^{-\rho \mu L_{cap}} \quad (2)$$

where $N_{Cap}$ is the capture count rate, $A_{Cap}$ is a value indicative of the capture gammas in the source volume initially moving toward the detector, $\rho$ is formation density, $\mu$ is formation mass attenuation coefficient, and $L_{cap}$ is the attenuation distance for capture gammas. The attenuation distance $L_{cap}$ may schematically be represented by the length of track 320 from source region 318 to detector 314.

The effects of hydrogen index on NInel and Ncap are complex. Higher hydrogen index results in smaller source volumes or clouds, and therefore longer attenuation distances. Longer attenuation distance causes both NInel and Ncap to decrease. However, higher hydrogen index implies lower formation density. Because the hydrogen index relates to hydrogen-bearing compounds in the formation, the hydrogen index is representative of constituents held in void spaces within the rock matrix. Further, the hydrogen-bearing constituents are less dense than the rock matrix and, consequently, the density of a formation including voids containing hydrogen-bearing constituents would be lower than the density of a formation without such voids. Lower formation density causes both NInel and Ncap to increase. The effects of longer attenuation distance tending to decrease count rates, and lower density tending to increase count rates, compete against each other as the hydrogen index varies from 0 (hard rock) to 1 (water).

In some systems, hydrogen index is computed using ratios between Ncap of two or more gamma detectors at different spacing and a previously known or estimated formation porosity. The ratio of Ncap of two or more differently-spaced gamma detectors is more sensitive to hydrogen index than inelastic ratios for the reason of a larger source volume or cloud, as schematically depicted in FIG. 3. However, at medium to high hydrogen index, the aforementioned increase in attenuation length with hydrogen index begins to out-compete the decrease in formation density. Consequently, the sensitivity of the capture ratio to the hydrogen index begins to diminish, as illustrated by FIG. 4.

Figure 4:
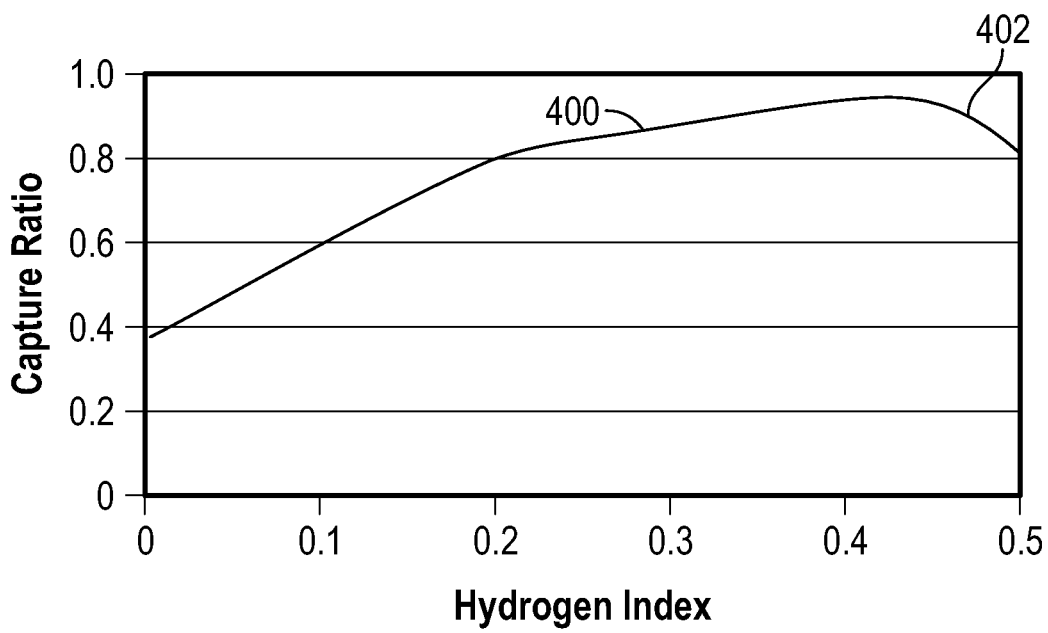
FIG. 4 show a graph of the ratio of Ncap of two or more differently-spaced gamma detectors (in the graph, "capture ratio") to the hydrogen index to describe shortcomings of related-art devices.

FIG. 4 show a graph of the ratio of Ncap of two or more differently-spaced gamma detectors (in the graph, "capture ratio") to the hydrogen index to describe shortcomings of related-art devices. As previously discussed, the hydrogen index correlates to porosity and methods by which to convert hydrogen index to porosity and vice versa would be readily apparent to one ordinarily skilled in the art having the benefit of this disclosure. In particular, FIG. 4 shows a flattening of the example capture-ratio-versus-hydrogen-index curve in FIG. 4 in region 400. Thus, determining hydrogen index based on capture ratios of two differently-spaced gamma detectors can become difficult in region 400, even knowing formation porosity in advance. Moreover, the capture ratio curve can even become non-monotonic, or reverse, as illustrated by region 402 in the example of FIG. 4, at hydrogen index values between about 0.4 and 0.5. Stated otherwise, using the ratio of Ncap of two or more differently-spaced gamma detectors (even with porosity known in advance), one may not be able to distinguish where on the non-monotonic example curve the solution resides.

Figure 5:
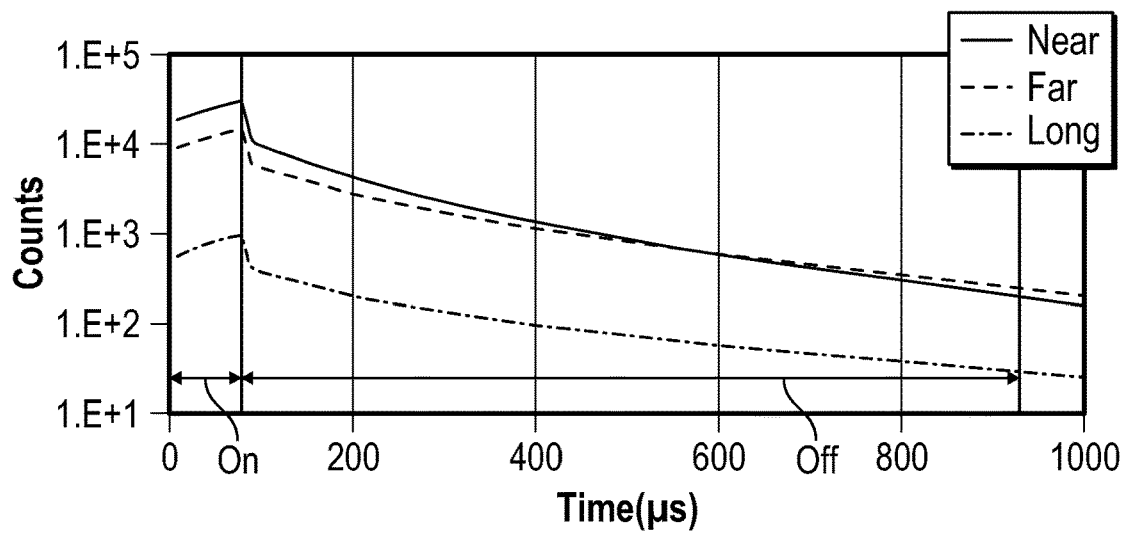
FIG. 5 is a plot of an example time-decay curve from near, far and long raw pulsed-neutron responses of a PNG tool according to certain illustrative embodiments of the present disclosure.

FIG. 5 is a plot of an example time-decay curve from near, far and long raw pulsed-neutron responses of a PNG tool such as those described herein. Time decay curves are essentially a time series of gamma-ray count rates that are recorded by the tool electronics from time zero to about 1 ms at each logging depth. FIG. 5 shows three curves corresponding to near, far and long detectors. Each decay curve depicted spans from time 0 to about 1 ms. As depicted in this example, the time bin size is 10 s. For a 1 ms time span, there can be about 100 time bins. Note in other embodiments, the number of time bins may vary depending on the time span and time bin size. As illustrated in FIG. 5, in the beginning of the decay curve measurement, the PNG is in the ON cycle operation mode. The tool ON cycle is the time period when the tool is on/activated and producing neutrons (typically 10-100 s for each duration). In the ON duration, the gamma count rates increase. As show in FIG. 5, after less than 100 s, the PNG cycles to OFF mode. The tool OFF cycle is the time period when the tool is off/deactivated and no longer producing neutrons (this time period may span for a few hundred microseconds to a few milliseconds). In the OFF duration, the count rate starts to decrease. Overall, the count rates span more than two orders of magnitudes.

Figure 6:
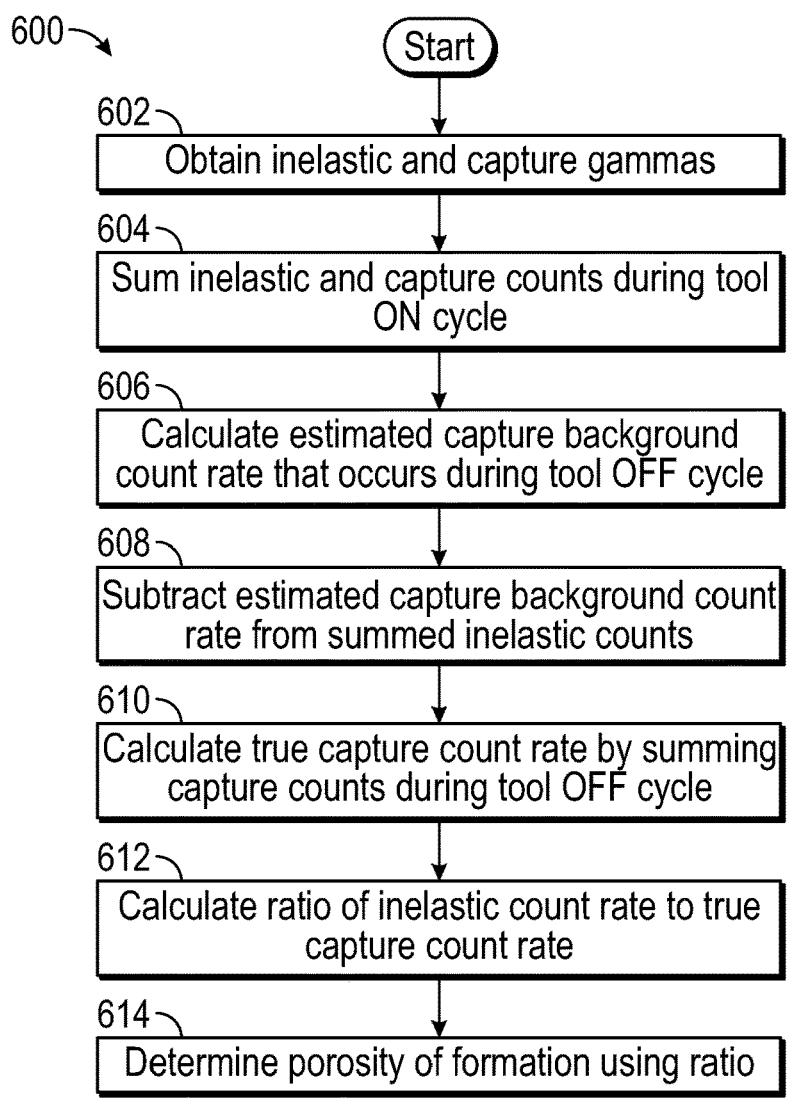
FIG. 6 is a flow chart of a method for determining porosity according to certain illustrative embodiments of the present disclosure.

In view of the foregoing, illustrative methods and embodiments of the present disclosure optimize the inelastic and capture ratio for porosity measurements. FIG. 6 is a flow chart of a method for determining porosity according to certain illustrative embodiments of the present disclosure. Pulsed-neutron data is first acquired through a well logging operation using a PNG tool (such as logging tool 10 or logging tool 53) having one or more gamma ray detectors, as described herein. At block 602, method 600 begins obtaining inelastic gamma and capture gamma using, for example, the detector(s) 204 at a specified borehole depth/sampling point of the formation. At each sampling point/log depth, the inelastic count rates and capture count rates can be computed using, for example, computer 22 or SCC of the logging tools as described herein. To calculate the inelastic count rate, processing circuitry of the system sums the inelastic and capture counts during an ON cycle of the downhole tool, at block 604.

At block 606, the system calculates an estimated capture background count rate that occurs during an OFF cycle of the downhole tool. In certain illustrative embodiments, the estimated capture background count rate may be calculated by applying a numerical factor, FCAP, to the capture counts recorded immediately after the tool is in the OFF cycle. The numerical factor FCAP may be a tool-design dependent mathematical constant or a tool-design dependent function, and may be characterized through laboratory characterization. In one illustrative embodiment, FCAP as a mathematical constant may take the form of a numeral (e.g., between 1.0-10.0) and would be based on the design of the tool.

Figure 7:
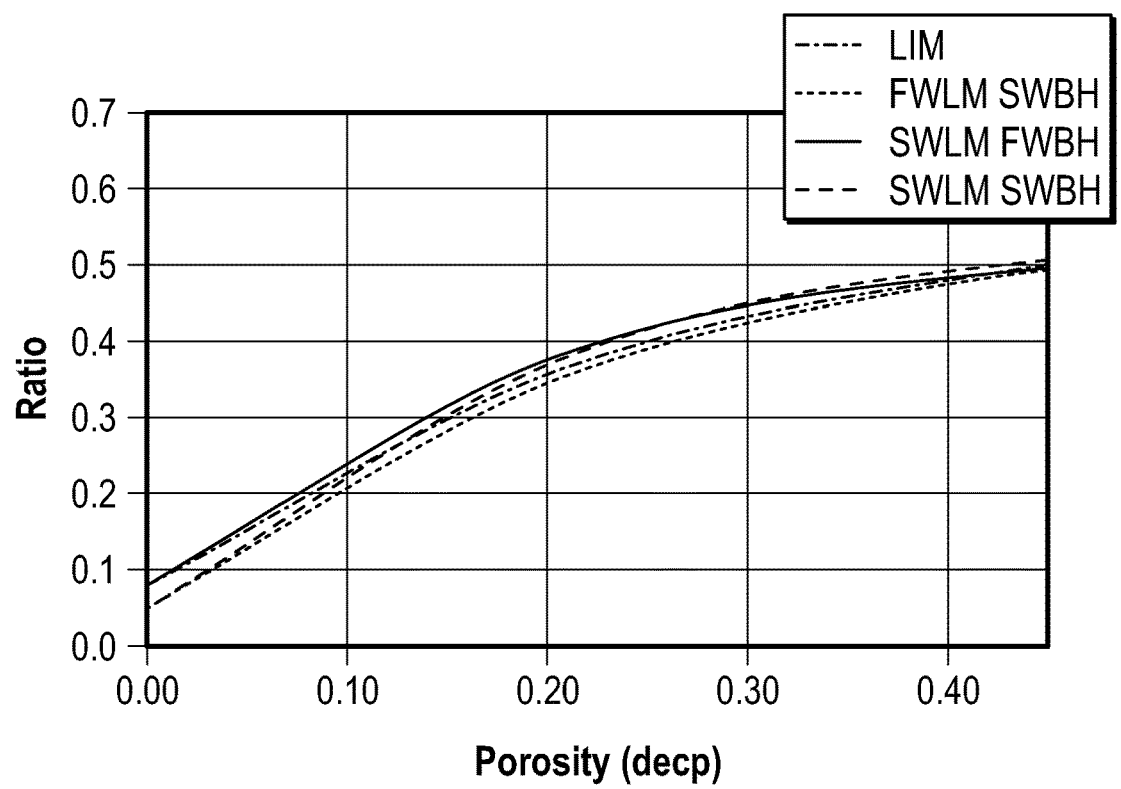
FIG. 7 is an illustrated transform curve from the ratio to porosity, according to certain illustrative embodiments of the present disclosure.

To help explain how FCAP may be calculated, FIG. 7 is an illustrated transform curve from the ratio to porosity in porosity units (p.u.) of decimal points (depc). Again, porosity correlates to the hydrogen index and there are a variety of methods by which to calculate the hydrogen index using porosity and vice versa. Four curves are presented in the chart (limestone filled with fresh water in a freshwater borehole, limestone filled with fresh water in a salt water borehole, limestone filled with salt water in a freshwater borehole, and limestone filled with saltwater in a saltwater borehole). In one example, through testing of the present disclosure, it was found that FCAP can be optimized by selecting numerical values between 1.0-10.0 until (1) the curves in FIG. 7 have the least deviation possible (e.g., 10% or less) and (2) are as steep as possible. The steepness of the curves in FIG. 7 reflect the sensitivity of the tool to porosity (the more flat the curves are, the less sensitive the tool is to porosity). In one example, the steepness of the curve may be characterized by the relative ratio difference for those of 0 pu rock and 40 pu rock. For each curve, the ratio values at 0 and 40 p.u. are subtracted from one another to calculate the relative difference for each curve. The relative difference value for each curve then characterizes the steepness for that curve for optimization purposes. The relative difference values may also be compared to some threshold value in certain illustrative embodiments to further optimize FCAP. Once the deviation and steepness requirements have been met, FCAP is optimized.

At block 608, the system subtracts the estimated capture background count rate from the summed inelastic counts, thereby calculating the inelastic count rate. The estimated capture counts are subtracted as background from the summed inelastic and capture counts as shown in Equation 3 below:

$$CR_{inel} = \sum_{ON} CR_i - F_{CAP} CR_{bk} \qquad \text{Eq. 3}$$

where $CR_{inel}$ is the inelastic count rate, $CR_i$ summed inelastic and capture counts during the ON cycle, $F_{CAP}$ is the capture count rate numerical factor, and $CR_{bk}$ is the estimated capture background count rate recorded immediately after the PNG is cycled to OFF. Here, the inelastic count rate is corrected for the capture background to increase porosity sensitivity. Also, note that Equation 3 is used to optimize $F_{CAP}$ until you have a plot like in FIG. 7, for example.

At block 610, the system calculates a true capture count rate by summing capture counts through a range of time windows during the OFF cycle of the downhole tool using:

$$CR_{cap} = \sum_{Off} CR_i \qquad \text{Eq. 4}$$

In block 610, the inelastic and capture responses are matched for borehole sensitivity. Matching refers to the process of selecting $F_{CAP}$ described above with reference to FIG. 7. In addition, the estimated capture background count rate may be optimized by manipulating the start and ending time bins of the recorded inelastic and capture counts. For example, through testing of the present disclosure, it was found that manipulating the starting time bin for FCAP (FCAP time bin starts when tool is in OFF cycle) to begin at 0-50 micro seconds after the tool OFF cycle begins with a duration of 20-100 micro seconds was an optimal time bin. Manipulation of the time bins increases the sensitivity of the tool to porosity, while desensitizing the tool to other variables such as salinity. The matching is part of the tool characterization for global applications.

At block 612, the system calculates the ratio of the inelastic count rate to the true capture count rate (CRinel/CRcap), then applies the equation as shown below to calculate porosity:

$$\phi = f(CR_{inel} / CR_{cap}) \qquad \text{Eq. 5}$$

Equation 5 is a generalized formula to calculate porosity Ø from the ratio of the inelastic count rate and capture count rate. f can be, for example, a $2^{nd}$ order polynomial or other suitable mathematical operators.

With reference back to FIG. 7, an illustrated transform curve from the ratio to porosity in units of decimal points is shown. Four curves are presented in the chart (limestone filled with fresh water in a freshwater borehole ("LIM"), limestone filled with fresh water in a salt water borehole ("FWLM SWBH"), limestone filled with salt water in a freshwater borehole ("SWLM FWBH"), and limestone filled with saltwater in a saltwater borehole ("SWLM SWBH")). The measurement sensitivity is significantly improved comparing to the curve in FIG. 4 because the curves in FIG. 7 do not have the non-monotonic, or reverse, region 402. Thus, the effect of water salinity, either borehole or formation, is significantly reduced.

At block 614, the system determines the formation porosity using the ratio (i.e. Equation 5). Thereafter, the formation porosity determination is output and may be applied to perform a variety of downhole applications including to complete a wellbore or plan, perform or analyze a wellbore operation. For example, the porosity determination may be used to target a certain formation for production or targeting a certain reservoir within a formation. The computations may be performed in real-time (e.g., fraction of second), downhole, at the surface, rig sites, remote computer centers, etc. Alternatively, the computations may be available to post-processing software. The porosity determination may be output in a variety of ways including via a display, printed report, etc.

In an alternative embodiment for scenarios where borehole compensation is not required, either inelastic or capture counts may be used to compute porosity. Here, for example, Equation 5 may be reflected as Ø=f(CRinel) or Ø=f(CRcap). The use of borehole compensation in certain embodiments may further increase measurement sensitivity.

Figure 8:
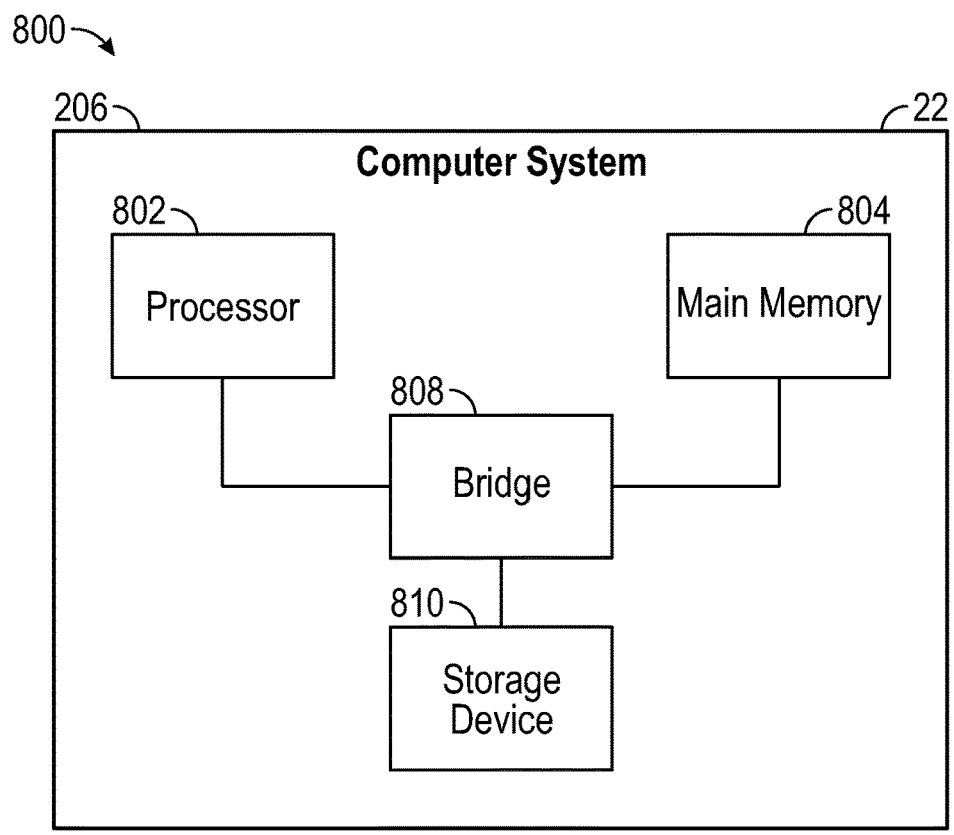
FIG. 8 illustrates in greater detail a computer system used to implement the disclosed illustrative embodiments and methods.

FIG. 8 illustrates in greater detail a computer system 800, which is illustrative of both surface computer system 22 and the computer system 206 or other processing circuitry within logging tool 10. Thus, computer system 800 described with respect to FIG. 8 could be proximate to the borehole during the time period within tool 10 is within the borehole, computer system 800 could be located at the central office of the oilfield services company, or computer system 800 could be within logging tool 10 (such as for LWD or MWD tools). The computer system 800 comprises a processor 802, and the processor couples to a main memory 804 by way of a bridge device 808. Moreover, processor 802 may couple to a long term storage device 810 (e.g., a hard drive) by way of bridge device 808.

Programs executable by the processor 802 may be stored on the storage device 810 (non-transitory, computer-readable storage), and accessed when needed by processor 802. The program stored on storage device 810 may comprise programs to implement the various embodiments of the present specification, including programs to determine porosity according to the present disclosure. In some cases, the programs are copied from storage device 810 to main memory 804, and the programs are executed from the main memory 804. Thus, both main memory 804 and storage device 810 are considered computer-readable storage mediums. The ratios and values indicative of hydrogen index/porosity generated by computer system 810 may be sent to a plotter that creates a paper-log, or the values may be sent to a display device which may make a representation of the log for viewing by a geologist or other person skilled in the art of interpreting such logs.

Moreover, those ordinarily skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Accordingly, the embodiments and methods described herein provide increased measurement sensitivity for downhole porosity measurements. The borehole environmental effects are much reduced through intrinsic borehole compensation. In addition, the water salinity sensitivity is reduced for both formation water and borehole water.

Embodiments and methods described herein further relate to any one or more of the following paragraphs:

1. A method to determine porosity of a subterranean formation, the method comprising: deploying a downhole tool in a borehole, the downhole tool having one or more gamma detectors; detecting inelastic gammas and capture gammas using the gamma detectors for a specified borehole depth of the formation; calculating an inelastic count rate by: summing inelastic and capture counts during an ON cycle of the downhole tool; calculating an estimated capture background count rate that occurs during an OFF cycle of the downhole tool; and subtracting the estimated capture background count rate from the summed inelastic counts, thereby calculating the inelastic count rate; calculating a true capture count rate by summing capture counts during the OFF cycle of the downhole tool; calculating a ratio of the inelastic count rate to the true capture count rate; and using the ratio to determine a porosity of the formation.

2. The method of paragraph 1, wherein the estimated capture background count rate is calculated by applying a numerical factor to capture counts recorded immediately after the downhole tool is in the OFF cycle.

3. The method of paragraphs 1 or 2, wherein the numerical factor is a mathematical constant or function dependent on a design of the downhole tool.

4. The method of any of paragraphs 1 to 3, wherein the numerical factor is selected by generating transfer curves based upon the ratio and porosity; and selecting a value for the numerical factor such that a deviation between the curves is minimized while a steepness of the transfer curves is maximized.

5. The method of any of paragraphs 1 to 4, wherein the estimated capture background count rate is optimized by manipulating start and ending time bins of recorded inelastic and capture counts.

6. The method of any of paragraphs 1 to 5, wherein the porosity is determined in real-time.

7. The method of any of paragraphs 1 to 6, wherein using the ratio to determine the porosity of the formation comprises applying a second order polynomial to the ratio.

8. A system comprising: a downhole tool having one or more gamma detectors; processing circuitry coupled to the downhole tool, the processing circuitry being operable to perform a method comprising: detecting inelastic gammas and capture gammas using the detectors for a specified borehole depth of the formation; calculating an inelastic count rate by: summing inelastic and capture counts during an ON cycle of the downhole tool; calculating an estimated capture count rate that occurs during an OFF cycle of the downhole tool; and subtracting the estimated capture count rate from the summed inelastic and capture counts, thereby calculating the inelastic count rate; calculating a true capture count rate by summing inelastic and capture counts during the OFF cycle of the downhole tool; calculating a ratio of the inelastic count rate to the true capture count rate; and using the ratio to determine a porosity of the formation.

9. The system of paragraph 8, wherein the estimated capture count rate is calculated by applying a numerical factor to inelastic and capture counts recorded immediately after the downhole tool is in the OFF cycle.

10. The system of paragraphs 8 or 9, wherein the numerical factor is a mathematical constant or function dependent on a design of the downhole tool.

11. The system of any of paragraphs 8 to 10, wherein the numerical factor is selected by generating transfer curves based upon the ratio and porosity; and selecting a value for the numerical factor such that a deviation between the curves is minimized while a steepness of the transfer curves is maximized.

12. The system of any of paragraphs 8 to 11, wherein the estimated capture count rate is optimized by manipulating start and ending time bins of the recorded inelastic and capture counts.

13. The system of any of paragraphs 8 to 12, wherein the porosity is determined in real-time.

14. The system of any of paragraphs 8 to 13, wherein using the ratio to determine the porosity of the formation comprises applying a second order polynomial to the ratio.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method to determine porosity of a subterranean formation, the method comprising:
    deploying a downhole tool in a borehole, the downhole tool having one or more gamma detectors;
    detecting inelastic gammas and capture gammas using the gamma detectors for a specified borehole depth of the formation;
    calculating an inelastic count rate by:
        summing inelastic and capture counts during an ON cycle of the downhole tool;
        calculating an estimated capture background count rate that occurs during an OFF cycle of the downhole tool; and
        subtracting the estimated capture background count rate from the summed inelastic counts, thereby calculating the inelastic count rate;
    calculating a true capture count rate by summing capture counts during the OFF cycle of the downhole tool;
    calculating a ratio of the inelastic count rate to the true capture count rate; and
    using the ratio to determine a porosity of the formation, wherein the estimated capture background count rate is calculated by applying a numberical factor to capture counts recorded immediately after the downhole tool is in the OFF cycle.

2. The method of claim 1, wherein the numerical factor is a mathematical constant or function dependent on a design of the downhole tool.

3. The method of claim 1, wherein the numerical factor is selected by:
    generating transfer curves based upon the ratio and porosity; and
    selecting a value for the numerical factor such that a deviation between the curves is minimized while a steepness of the transfer curves is maximized.

4. The method of claim 1, wherein the estimated capture background count rate is optimized by manipulating start and ending time bins of recorded inelastic and capture counts.

5. The method of claim 1, wherein the porosity is determined in real-time.

6. The method of claim 1, wherein using the ratio to determine the porosity of the formation comprises applying a second order polynomial to the ratio.

7. A system comprising:
    a downhole tool having one or more gamma detectors;
    processing circuitry coupled to the downhole tool, the processing circuitry being operable to perform a method comprising:
        detecting inelastic gammas and capture gammas using the detectors for a specified borehole depth of a formation;
        calculating an inelastic count rate by:
            summing inelastic and capture counts during an ON cycle of the downhole tool;
            calculating an estimated capture count rate that occurs during an OFF cycle of the downhole tool; and
            subtracting the estimated capture count rate from the summed inelastic and capture counts, thereby calculating the inelastic count rate;
        calculating a true capture count rate by summing inelastic and capture counts during the OFF cycle of the downhole tool;
        calculating a ratio of the inelastic count rate to the true capture count rate; and
    using the ratio to determine a porosity of the formation, wherein the estimated capture count rate is calculated by applying a numerical factor to inelastic and capture counts recorded immediately after the downhole tool is in the OFF cycle.

8. The system of claim 7, wherein the numerical factor is a mathematical constant or function dependent on a design of the downhole tool.

9. The system of claim 7, wherein the numerical factor is selected by:
  generating transfer curves based upon the ratio and porosity; and
  selecting a value for the numerical factor such that a deviation between the curves is minimized while a steepness of the transfer curves is maximized.

10. The system of claim 7, wherein the estimated capture count rate is optimized by manipulating start and ending time bins of the recorded inelastic and capture counts.

11. The system of claim 7, wherein the porosity is determined in real-time.

12. The system of claim 7, wherein using the ratio to determine the porosity of the formation comprises applying a second order polynomial to the ratio.

13. A non-transitory computer readable medium comprising instructions which, when executed by at least one processor, causes the processor to perform a method comprising:
  detecting inelastic gammas and capture gammas using one or more gamma detectors for a specified borehole depth of a downhole formation, the gamma detectors forming part of a downhole tool;
  calculating an inelastic count rate by:
    summing inelastic and capture counts during an ON cycle of the downhole tool;
    calculating an estimated capture count rate that occurs during an OFF cycle of the downhole tool; and
    subtracting the estimated capture count rate from the summed inelastic and capture counts, thereby calculating the inelastic count rate;
  calculating a true capture count rate by summing inelastic and capture counts during the OFF cycle of the downhole tool;
  calculating a ratio of the inelastic count rate to the true capture count rate; and
  using the ratio to determine a porosity of the formation,
  wherein the estimated capture count rate is calculated by applying a numerical factor to inelastic and capture counts recorded immediately after the downhol tool is in the OFF cycle.

14. The computer readable medium of claim 13, wherein the numerical factor is a mathematical constant or function dependent on a design of the downhole tool.

15. The computer readable medium of claim 13, wherein the numerical factor is selected by:
  generating transfer curves based upon the ratio and porosity; and
  selecting a value for the numerical factor such that a deviation between the curves is minimized while a steepness of the transfer curves is maximized.

16. The computer readable medium of claim 13, wherein the estimated capture count rate is optimized by manipulating start and ending time bins of the recorded inelastic and capture counts.

17. The computer readable medium of claim 13, wherein using the ratio to determine the porosity of the formation comprises applying a second order polynomial to the ratio.

* * * * *